United States Patent Office 3,645,936
Patented Feb. 29, 1972

3,645,936
FLAME-RETARDANT REGENERATED
CELLULOSE FILAMENTS
Brian C. Gardner, Kenilworth, England, assignor to
Courtaulds Limited, London, England
No Drawing. Filed May 5, 1970, Ser. No. 34,868
Claims priority, application Great Britain, May 9, 1969,
23,676/69
Int. Cl. C08g 51/56; D01f 3/12; D06m 13/44
U.S. Cl. 260—9                                10 Claims

ABSTRACT OF THE DISCLOSURE

Flame retardant regenerated cellulose filaments incorporate both tris (2,3 dibromopropyl) phosphate (TDBPP) and a polymer made by reacting excess ammonia with tetrakishydroxymethyl phosphonium chloride (THPC) or THPC/urea or THPC/urea/melamine.

---

This invention relates to regenerated cellulose filaments having flame-retardant properties and to a process for making them.

Regenerated cellulose filaments made by the viscose process have been rendered flame-retardant by the use of tris (2,3 dibromopropyl) phosphate (TDBPP) which has been applied as a solution to a fabric or garment as described in U.S. patent specification No. 2,574,515, and which has also been incorporated into the viscose prior to spinning the filaments as described in the specification of our U.K. patent specification No. 1,158,231.

Regenerated cellulose fabrics and garments have also been given flame-retardant properties by impregnating them with a polymer obtained by reacting a tetrakishydroxymethyl phosphonium salt (THP salt) with ammonia or an amino compound, for example urea or melamine. Flame-retarding polymers of this type (THP polymers) are described in U.K. patent specifications Nos. 906,314, 935,098 and 938,989.

The usual process of applying these THP polymers is to form a low molecular weight, water-soluble precondensate, apply this to the fabric and complete the condensation and curing reactions on the fabric, for example by an ammonia treatment.

We have also put these THP polymers in the cured state into viscose by reducing their mean particle diameter to below 4 microns and then dispersing them in the viscose prior to spinning. However, at concentrations of THP polymer necessary to impart adequate flame-retardant properties to the regenerated cellulose filaments, it was found that the mechanical properties of the filaments became unsatisfactory.

We have now found that certain THP polymers and TDBPP together in regenerated cellulose filaments made by the viscose process have a synergistic effect on the flame-retardant properties of the filaments, giving improved properties compared with the same concentrations of either of the combinants above Accordingly, the present invention comprises flame-retardant regenerated cellulose filaments incorporating both TDBPP and a polymer made by reacting tetrakishydroxymethyl phosphonium chloride (THPC) or precondensate formed by the reaction of 2 moles of THPC and 1 mole of urea, with excess ammonia.

The invention includes a process for making flame-retardant regenerated cellulose filaments comprising incorporating in a viscose both TDBPP and a polymer made by reacting THPC or a precondensate formed by the reaction of 2 moles of THPC and 1 mole of urea, with excess ammonia and spinning the viscose into a regeneration bath to form filaments The precondensate reactants may also include up to 0.12 mole melamine.

The precondensate may be prepared as an aqueous solution by refluxing the reactants in an aqueous medium and then rapidly cooling the reaction mixture. Suitable conditions comprise about a 50 percent by weight aqueous solution of the reactants with a reflux time of 30 to 60 mintues.

The method of making the polymer may be the same using either an aqueous THPC solution or the aqueous precondensate solution and may comprise slowly adding either of these solutions to an excess of an aqueous solution of ammonia whilst stirring the mixture. The polymer formed is then preferably oxidised—this may be carried out in situ using hydrogen peroxide solution—to ensure that the phosphorus is all in the pentavalent state; this avoids any adverse affect on the dyeability of filaments incorporating the polymer.

The polymer may then be filtered from solution washed with water to remove any chloride ion and then dried. The drying is preferably carried out under vacuum at a temperature of 105° to 110° C. as this gives a polymer which will disperse in water to an extent of 15 percent by weight. This compares with 12 percent by weight for polymer dried at 70° C.

The particle size of the polymer should be sufficiently small to be able to spin viscose containing polymer particles without blocking up the jet holes. We prefer the mean particle diameter to be preferably not greater than about 4 microns and better still not greater than 2 microns. To this end, the polymer may be ball-milled as an aqueous dispersion and a dispersing agent may also be used.

The aqueous dispersion of polymer may be stirred into a batch of viscose or injected continuously into the viscose spinning line prior to extrusion as in the known spin dyeing technique. The TDBPP, either neat or as a solution or dispersion, may be added to the viscose in the same way but it is preferably not left in contact with the viscose too long before spinning as it is subject to hydrolysis. The order in which the polymer and the TDBPP are added to the viscose is not critical except when the polymer is formed from a precondensate for which melamine is one of the reactants, in which case the polymer should be dispersed before the TDBPP in order to obtain satisfactory spinning.

The viscose is then spun into a regeneration bath to form filaments which may be given the conventional sequence of treatments including stretching, washing, desulphurising and finishing.

The flame-retardant properties of the filaments improve as the concentration of the polymer and the TDBPP is increased, but as there is a corresponding decline in the mechanical properties of the filaments at the higher levels of concentration, the concentration levels used are a compromise between what is acceptable for both these properties.

In deciding upon the levels to be used, the end use of the filaments has to be considered because different end uses require different levels of flame-retardance and different filament strengths. An associated consideration is that the mechanical properties of heavier denier filaments are less deleteriously affected than those of finer denier filaments.

In general we have found that a concentration range of about 15 to 30 percent by weight, based on the weight of cellulose, of total polymer and TDBPP covers most of the possibilities, with the higher levels being more suitable for heavier deniers.

The ratio of polymer and TDBPP is also a factor for consideration. There is preferably between about 10 percent and 68 percent by weight of TDBPP and between about 90 percent and 32 percent by weight of the polymer. Within this range, the optimum flame-retardance is obtained at between about 23 percent and 57 percent by weight of TDBPP and between about 77 percent and 43 percent by weight of the polymer.

The invention is illustrated by the following examples in which percentages are by weight.

EXAMPLE 1

A THPC/ammonia polymer was made by the following procedure:

10 litres of demineralised water and 2.5 litres of 0.880 ammonia solution were stirred in a stainless steel vessel. 1560 mls. of an aqueous 80 percent solution of THPC and 940 mls. of demineralised water were mixed together and the resulting solution was slowly stirred into the aqueous ammonia solution. Stirring was continued after the addition was complete and after thirty minutes 1 litre of 100 volume hydrogen peroxide was slowly added, stirring continuing until the solution was cool enough to filter. The solid polymer was filtered off under vacuum and washed until the filtrate contained no chloride ions when tested with silver nitrate solution. The solid polymer was then dried in a vacuum oven at 108° C. The dried polymer weighed 750 gms.

An aqueous dispersion of the polymer was prepared by ball-milling the polymer as a 12 percent aqueous solution containing a dispersing agent.

The polymer dispersion was added to an aged viscose while stirring rapidly in an amount to give a viscose containing 10 percent of polymer based on the weight of cellulose. Neat TDBPP was then rapidly stirred into the viscose in an amount to give 10 percent based on the weight of cellulose.

The viscose was de-aerated under vacuum and then extruded through a spinning jet into a spin bath containing 8.5 percent of sulphuric acid, 1.0 percent of zinc sulphate and 17.0 percent of sodium sulphate, and at a temperature of 45° C. The yarn was spun at a rate of 65 metres per minute and comprised 50 filaments giving an overall denier of 375.

The yarn was washed free from acid and salts, desulphurised using 0.6 percent sodium sulphide solution at 55° C. for 25 minutes, and washed free from the desulphurising bath. The yarn was then given an acid scour using 0.3 percent hydrochloric acid at ambient temperature for 15 minutes, washed free from acid, and then given a soap finish before drying at 75° C.

As a basis for comparison to show the synergistic effect obtained by the process of the invention, yarns were also made according to the above conditions but containing respectively 20 percent of TDBPP and 20 percent of THPC/NH₃ polymer.

The tensile properties of the three yarns are shown in the following table in which the tenacities are shown in grams per denier and the extensions as a percentage.

| Flame retardant | Air dry | | Wet | |
|---|---|---|---|---|
| | Tenacity | Extension | Tenacity | Extension |
| 20 percent TDBPP | 1.49 | 22.1 | 0.69 | 31.5 |
| 20 percent THPC/NH₃ polymer | 1.08 | 21.6 | 0.43 | 19.5 |
| 10 percent TDBPP plus 10 percent THPC/NH₃ polymer | 1.48 | 19.0 | 0.68 | 23.1 |
| 5 percent TDBPP plus 15 percent THPC/NH₃ polymer | 1.19 | 24.7 | 0.45 | 22.8 |

The three yarns were each used to make a knitted fabric made on a circular knitting machine. The fabrics were relaxed in water and then dried flat at 80° C. Strips measuring 5.1 cms. in width and 31.8 cms. long were cut from each fabric and tested for flame-retardance in accordance with the method given in British Standard Specification 3119.

The average results from this test were:

| Flame retardant | After flaming (sec.) | Char length (cm.) | After-glow (sec.) |
|---|---|---|---|
| 20 percent TDBPP | 2.1 | 14.0 | Nil. |
| 20 percent THPC/NH₃ | 0.3 | 18.4 | Nil. |
| 10 percent TDBPP plus 10 percent THPC/NH₃ polymer | Nil | 8.9 | Nil. |
| 5 percent TDBPP plus 15 percent THPC/NH₃ polymer | Nil | 9.6 | Nil. |

The above results show that the flame-retardance of the filaments according to the invention is significantly improved compared with that of filaments containing the combinants alone. Also, the mechanical properties of the filaments are maintained at satisfactory values, although in the case of the filaments containing 15 percent of THPC/ammonia polymer, the more deleterious effect which the polymer has on these properties is shown.

EXAMPLE 2

A THPC/urea/ammonia polymer was made by the following procedure:

790 gms. of an 80 percent aqueous solution of THPC was refluxed together with 100 gms. of urea and 450 gms. of demineralised water for 1 hour to form a solution of a THPC/urea precondensate. 600 gms. of this solution was then slowly stirred into a mixture of 600 mls. of 0.880 ammonia solution and 2400 mls. of demineralised water. 20 minutes after the addition was completed, 210 mls. of 100 volume hydrogen peroxide was slowly added and stirring was continued until the mixture was cool. The solid polymer was then treated as in Example 1 except that drying was carried out at 70° C. 141 gms. of white solid polymer was produced.

The procedure for forming a dispersion of the polymer, for incorporating the dispersion and the TDBPP in the viscose and for spinning the filaments was then as in Example 1. The results are shown in the following table together with the results using respectively 20 percent of the polymer alone and 20 percent of TDBPP alone for comparison. The tenacities (Ten.) are shown in gms. per denier and the extensions (Ext.) as a percentage. The flame retardance was tested in accordance with the method given in British Standard Specification 3119.

| THPC/urea/NH₃ polymer, percent | TDBPP, percent | Tensile properties | | | | Flame retardance | | |
|---|---|---|---|---|---|---|---|---|
| | | Air dry | | Wet | | After-flaming (sec.) | Char length (cm.) | After-glow (sec.) |
| | | Ten. | Ext. | Ten. | Ext. | | | |
| 20 | Nil | 1.00 | 22.1 | 0.36 | 21.0 | Burnt completely | | Nil |
| 10 | 10 | 1.40 | 19.3 | 0.62 | 21.2 | Nil | 8.9 | Nil. |
| Nil | 20 | 1.49 | 22.1 | 0.69 | 31.5 | 2.1 | 14.0 | Nil. |

Again, the improved flame-retardance of the two additives together is shown as well as the maintenance of satisfactory mechanical properties.

EXAMPLE 3

Two THPC/urea-melamine/ammonia polymers were made by the following procedure using respectively 5 gms. of melamine (0.05 mole) and 12.5 gms. of melamine (0.12 mole):

The melamine was refluxed with 50 gms. of urea and 325 gms. of demineralised water until the solids had dissolved, when 390 gms. of an 80 percent aqueous solution of THPC at 90° C. was added. The refluxing was continued for one hour to form a solution of a THPC/urea-melamine precondensate which was then overlooked.

The procedure of Example 2 was then followed except that the drying of the polymer was carried out at 108° C. The polymer yields were, respectively, 141 gms. and 154 gms. The polymer had to be broken down into powder form by passage through a hammer mill before being formed into an aqueous dispersion by ball-milling.

Filaments were then spun using each of the polymers together with TDBPP according to the procedure of Example 1. The results are shown in the following table together with the results using 20 percent of each polymer alone and 20 percent of TDBPP alone. The tenacities (Ten.) are shown in gms. per denier and the extensions (Ext.) as a percentage. The flame retardance was again tested in accordance with the method given in British Standard Specification 3119.

| THPC urea-melamine/NH$_3$ polymer, percent | TDBPP, percent | Tensile properties | | | | Flame retardance | | |
|---|---|---|---|---|---|---|---|---|
| | | Air dry | | Wet | | After-flaming (sec.) | Char length (cm.) | After-glow (sec.) |
| | | Ten. | Ext. | Ten. | Ext. | | | |
| 20 (0.05 mole) | Nil | 1.18 | 23.3 | 0.45 | 25.0 | Burnt completely | | Nil. |
| 20 (0.12 mole) | Nil | 1.01 | 22.6 | 0.37 | 21.9 | Burnt completely | | Nil. |
| 10 (0.05 mole) | 10 | 1.49 | 20.5 | 0.60 | 23.5 | Nil | 6.0 | Nil. |
| 10 (0.12 mole) | 10 | 1.61 | 20.8 | 0.70 | 24.3 | Nil | 10.8 | Nil. |
| Nil | 20 | 1.49 | 22.1 | 0.69 | 31.5 | 2.1 | 14.0 | Nil. |

As in Examples 1 and 2, both polymers show improved flame-retardance in combination with TDBPP compared with the combinants alone. Also, the mechanical properties are maintained at good levels in both cases.

What is claimed is:

1. Flame retardant regenerated cellulose filaments having incorporated therein both tris(2,3 - dibromopropyl) phosphate (TDBPP) and a polymer made by reacting excess ammonia with a substance selected from the group consisting of tetrakishydroxymethyl phosphonium chloride (THPC) and a precondensate formed by the reaction of 2 moles of THPC and 1 mole of urea the TDBPP being present in a proportion of 10 to 68% by weight and the polymer in a corresponding proportion of 90 to 32% by weight, based on the total concentration of TDBPP and polymer.

2. Filaments as claimed in claim 1, in which the incorporated polymer is made from a precondensate which is formed by the reaction of 2 moles of THPC, 1 mole of urea and up to 0.12 mole of melamine.

3. Filaments as claimed in claim 1 in which the total concentration of the TDBPP and the polymer comprises about 15 to 30 percent by weight based on the weight of cellulose.

4. Filaments as claimed in claim 1 in which the proportions comprise 23 to 57 percent by weight of TDBPP and 77 to 43 percent by weight of the polymer.

5. Filaments as claimed in claim 1 in which the polymer comprises particles having a mean particle diameter not greater than about 4 microns.

6. A process for making flame retardant regenerated cellulose filaments comprising incorporating in a viscose both TDBPP and a polymer made by reacting excess ammonia with a substance selected from the group consisting of THPC and a precondensate formed by the reaction of 2 moles of THPC and 1 mole of urea, the TDBPP being present in a proportion of 10 to 68% by weight and the polymer in a corresponding proportion of 90 to 32% by weight, based on the total concentration of TDBPP and polymer.

7. A process as claimed in claim 6 in which the incorporated polymer is made from a precondensate which is formed by the reaction of 2 moles of THPC, 1 mole of urea and up to 0.12 mole of melamine.

8. A process as claimed in claim 7 in which the polymer is mixed into the viscose prior to the addition of the TDBPP.

9. A process as claimed in claim 6 including the preliminary step of treating the polymer with hydrogen peroxide.

10. A process as claimed in claim 6 in which the polymer is added to the viscose as a dispersion in aqueous solution.

References Cited

UNITED STATES PATENTS

| 2,574,515 | 11/1951 | Walter et al. | 260—461 |
| 3,243,391 | 3/1966 | Wagner | 260—15 |
| 3,054,698 | 9/1962 | Wagner | 117—136 |

FOREIGN PATENTS

| 769,630 | 10/1967 | Canada | 117—136 |
| 882,993 | 11/1961 | Great Britain | 260—9 |
| 924,945 | 5/1963 | Great Britain | 260—45.7 P |
| 938,989 | 10/1963 | Great Britain | 260—45.7 P |
| 1,158,231 | 7/1969 | Great Britain | 117—136 |

WILLIAM H. SHORT, Primary Examiner

E. WOODBERRY, Assistant Examiner

U.S. Cl. X.R.

8—116 R, P, 116.2; 106—168; 117—136, 145; 264—191